INVENTORS
JOHN R. CIELO
HARRY S. HOFFMAN, JR.

BY Nathan Cass
ATTORNEY

United States Patent Office

3,553,620
Patented Jan. 5, 1971

3,553,620
COMBINED TRANSFORMER AND INDICATOR DEVICE
John R. Cielo, Kingston, and Harry S. Hoffman, Jr., Saugerties, N.Y., assignors to International Business Machines Corporation, Armonk, N.Y., a corporation of New York
Filed Dec. 20, 1967, Ser. No. 691,996
Int. Cl. H01f 21/08
U.S. Cl. 336—165                                7 Claims

ABSTRACT OF THE DISCLOSURE

A DC-to-DC power converter incorporating a combined transformer and inductor device comprised of a three-legged magnetic structure having an air gap in the center leg and primary and secondary windings arranged on the three legs to provide combined cooperative transformer and inductor action. The primary and secondary windings are each of push pull configuration, and in one form the cooperating primary and secondary winding push are poled and located to provide MMF-bucking action applying the entire primary MMF across the inductor leg, while in another form only the core magnetizing MMF is seen across the inductor leg, and an additional primary winding is provided to boost the flux in that leg. In each case the inductor leg has an air gap to provide it with significantly higher reluctance than that of the remainder of the magnetic circuit.

CROSS-REFERENCE TO RELATED APPLICATIONS

(1) DC-to-DC Converter with Continuous Feed to the Load, Harry S. Hoffman, Jr. et al., U.S. Ser. No. 667,762, filed Sept. 14, 1967, now Pat. No. 3,443,195.

(2) Improved DC-to-DC Converter with Continuous Feed to the Load, John R. Cielo, U.S. Ser. No. 667,698, filed Sept. 14, 1967, now Pat. No. 3,443,194.

BACKGROUND OF THE INVENTION

The present invention relates generally to power systems and devices, and more particularly to a combined transformer and inductor device for use therein.

DC voltage sources of appropriate magnitudes and regulation and smoothness characteristics are required in many modern day electronic equipment such as, for example, electronic equipment used in computer systems. The generation of such DC voltages may typically be accomplished by direct conversion of an AC voltage from an AC source to the required DC voltage, or by first rectifying the AC voltage and then using a DC-to-DC converter to convert the rectified DC voltage to the required DC voltage level having a desired smoothness and regulation. The combined transformer and inductor device of the present invention will be illustrated herein as applied to a system of the latter type in which a DC-to-DC converter is employed to convert an input DC voltage, for example, 290 volts DC, derived by rectification from a 208-volt, 3-phase AC source, into a required lower level output DC voltage of, for example, 3 volts DC.

A DC-to-DC inverter typically comprises five basic elements: (1) an inverter including switching means, such as one or more switching transistors, for converting the input DC voltages to an AC voltage, usually of rectangular waveform; (2) a transformer to which the AC voltage produced by the inverter is applied for appropriate level conversion; (3) rectifier means for rectifying the output from the transformer; (4) a DC filter to which the rectified output from the rectifier means is applied for providing a DC output voltage having the required smoothness; and (5) control means responsive to the output voltage for controlling the "on" and "off" periods of the inverter switching transistors to provide the required regulation of the DC output voltage.

In the aforementioned copending patent applications (which are assigned to the same assignee as the instant application), improvements in DC-to-DC converters are disclosed, whereby fault protection is achieved for the inverter switching transistors by inserting one or more inductors in the primary of the transformer, and whereby improved output voltage regulation and smoothness are achieved by providing a coupling winding for each inductor arranged os that energy stored in the inductor during the "on" period of a respective inverter switching transistor is coupled to the load during the next following "off" period of the inverter switching transistors.

SUMMARY OF THE INVENTION

In accordance with the present invention, the functions of both a transformer and an inductor are advantageously combined into a single magnetic device for cooperative operation in a manner which permits achieving novel operating characteristics, whereby savings in winding and core material are made possible, as well as greater flexibility in circuit design and improved overall electrical performance. The features of such a combined transformer and inductor device may be employed to particular advantage for accomplishing the functions of the transformer and inductor in a DC-to-DC converter of the general type disclosed in the aforementioned patent applications, whereby even further improvements in DC-to-DC converters are realized. It is to be understood that although the combined transformer and inductor device of the present invention will be illustrated with respect to such a DC-to-DC conversion system, it will be apparent from the description herein that the invention is also useful in other types of power supply circuits, as well as any other applications where the features and characteristics of the invention can be used to advantage.

It is therefore a broad object of the invention to provide a combined transformer and inductor device having advantageous use for electrical circiuts, particularly those used in power supply systems.

Another object of the invention is to provide improvements in a DC-to-DC converter by the incorporation therein of a combined inductor and transformer in accordance with the invention.

A further object of the invention is to provide a combined transformer and inductor device having novel structural and performance characteristics.

The foregoing and other objects, features and advantages of the invention will be apparent from the following more particular description of the preferred embodiments of the invention, as illustrated in the accompanying drawings.

In the drawings.

Like designations refer to like elements throughout the figures of the drawings.

Figure 1:
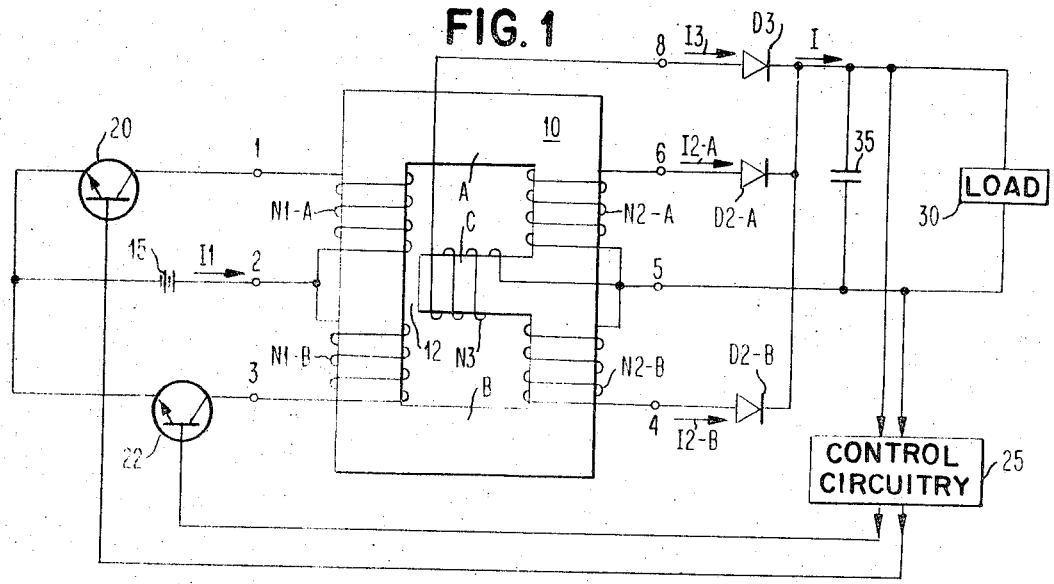
FIG. 1 is a schematic and electrical circuit diagram of a DC-to-DC converter incorporating a combined transformer and inductor device in accordance with the invention.

With reference to the DC-to-DC converter illustrated in FIG. 1, the combined transformer and inductor device is designated by the numeral 10, and includes a three-legged magnetic structure A, C, B having a center leg C provided with a gap 12, which may be an air gap, as shown, or if desired, a high reluctance material. Gap 12 serves to prevent saturation of the magnetic material of which the magnetic structure is comprised, and thereby permit use of a much smaller volume of magnetic material than would otherwise be required.

The three-legged magnetic structure of the combined transformer and inductor device 10 in FIG. 1 is provided with series-connected primary windings N1–A and N1–B having input terminals 1, 2 and 3, as shown, series-connected secondary windings N2–A and N2–B having output terminals 4, 5 and 6, and a center leg secondary winding N3 having output terminals 5 and 8. The manner in which the windings in FIG. 1 are shown wound on their respective legs illustrate their relative polarities. It will be understood that the outer magnetic path including legs A and B provides a relatively low reluctance magnetic path between the primary and secondary windings N1–A, N1–B and N2–A, N2–B, since it does not include the air gap 12. On the other hand, the magnetic path between secondary winding N3 and either the primary winding N1–A, N1–B or the secondary windings N2–A, N2–B is of relatively high magnetic reluctance, for example, 10 times greater, since coupling is via center leg C and air gap 12.

It will accordingly be understood that the primary and secondary windings N1–A, N1–B and N2–A, N2–B in FIG. 1 are relatively closely coupled and serve to provide essentially transformer operation, while the center leg winding N3 is relatively loosely coupled with respect thereto and serves to provide essentially inductor operation. It is important to realize in connection with the present invention that the transformer and inductor operation in the device 10 are not independent, but, in accordance with the invention, the air gap 12 is chosen to provide sufficient coupling between windings N3 and windings N1–A, N1–B and N2–A, N2–B so that cooperative interaction occurs in a manner which permits achieving particularly advantageous performance characteristics. These advantages will become evident from the following description of the arrangement and operation of the combined transformer and inductor device 10 in the DC-to-DC converter of FIG. 1, which converter is of the general type disclosed in the aforementioned patent applications.

It will be seen in FIG. 1 that a DC power source 15 has its positive end coupled to input terminal 2 of the combined transformer and inductor device 10 and its negative end coupled to input terminals 1 and 3 via the emitter and collector of a respective series transistor 20 or 22. These transistors 20 and 22 serve as switches to convert the DC source 15 into an AC signal. Regulation control is provided in a conventional manner by appropriately controlling the conduction time of the transformer primary current I1 in response to output signals applied to the transistor bases from control circuitry 25. It will be understood that control circuitry 25 may be of conventional form for detecting variations across load 30 and for providing appropriate regulation control output signals to the bases of transistors 20 and 22 in response thereto. A filter capacitor 35 is connected across load 30 in a conventional manner.

Now considering the output terminals 4, 5, 6, 7 and 8 of the combined transformer and inductor device 10, it will be understood that load current I supplied to load 30 is derived from output currents I2–A, I2–B and I3 from respective output terminals 6, 4 and 8 via respective diodes D2–A, D2–B and D3, output terminal 5 being connected to the other side of load 30 for use as a return line.

Figure 2:
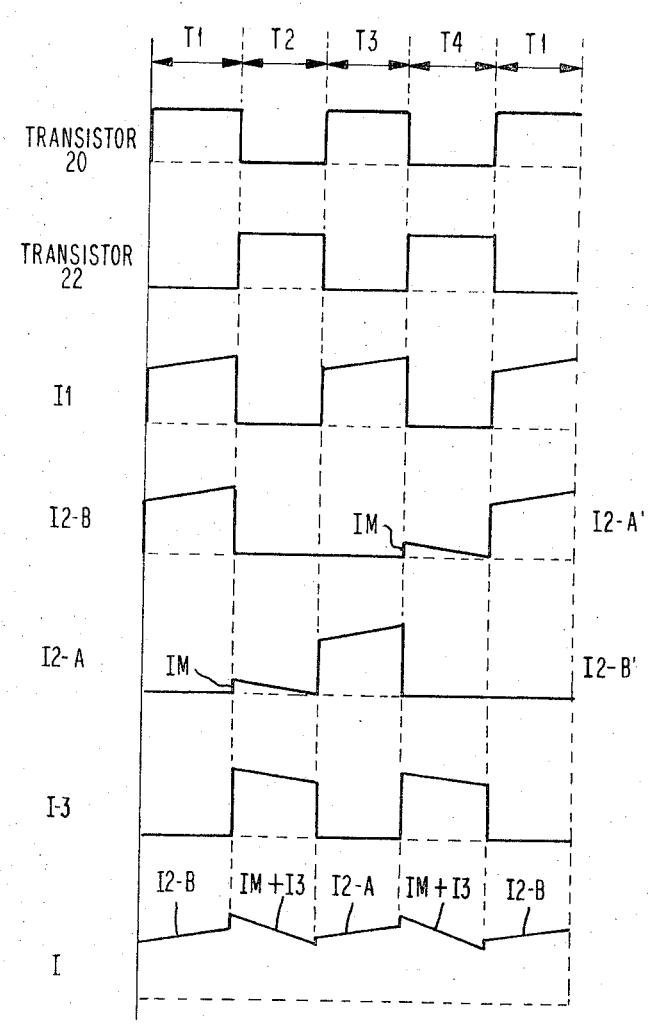
FIG. 2 is a plurality of timing graphs illustrating the waveforms of pertinent signals in the circuit of FIG. 1.

The specific manner in which the load current I is derived from output currents I2–A, I2–B and I3 during the operating periods of the DC-to-DC converter of FIG. 1 in accordance with the invention will now be considered in detail with reference to the timing graphs of FIG. 2.

It will be understood from FIG. 2 that the operation of the DC-to-DC converter of FIG. 1 may be divided into four repetitive time periods T1, T2, T3 and T4. Periods T1 and T3 are power stroke periods during which a respective one of transistors 20 and 22 is conducting, and periods T2 and T4 are interim periods during which neither of transistors 20 and 22 is conducting. Operation during each of these timing periods T1 to T4 is as follows.

Time period T1

As indicated in FIG. 2, time period T1 is initiated by control circuitry 25 turning on transistor 20 while maintaining transistor 22 off, thereby causing primary current I1 to flow via input terminals 2 and 1 from DC source 15 through primary winding N1–A. It will be understood from the winding polarities illustrated in FIG. 1 that primary current flow through primary winding N1–A will induce voltages in secondary windings N2–A, N2–B and N3 such that only the voltage induced in secondary winding N2–B will have a polarity which will permit an output current I2–B to flow via terminal 4 through its respective diode D2–B to load 30; the voltages induced in the other secondary windings N2–A and N3 will have polarities which will reverse bias their respective diodes D2–A and D3. Thus, the resultant load current I flowing during period T1 is merely the current I2–B, as illustrated in the I2–B and I graphs in FIG. 2.

It is important to note that, during period T1, the magnetic flux which will be caused to flow in center leg C as a result of the flow of primary current I1 in primary winding N1–A is additive with respect to the magnetic flux which is caused to flow in center leg C as a result of the flow of secondary current in winding N2–B. Since the polarity of the voltage induced in secondary winding N3 during period T1 is such as to reverse bias diode D3, the energy stored in center leg C by the two additive fluxes will not be dissipated during period T1, and will thus remain stored in center leg C when period T1 terminates. The amount of energy stored in center leg C during period T1 will be determined by the mutual coupling existing between center leg C and the outer magnetic path including legs A and B. The required mutual coupling is conveniently provided by the size chosen for air gap 12. It will be understood that the lower limit of mutual coupling will be determined by the amount of flux required to be stored in center leg C during period T1 to provide the operation occurring during period T2 described below, while the upper limit of mutual coupling will be determined by the requirement that the magnetic material of the three-legged structure not become saturated, or operate so close to saturation as to interfere with transformer operation.

Time period T2

As indicated in FIG. 2, time period T2 begins when control circuitry 25 turns transistor 20 off, while still maintaining transistor 22 off, in which case, no primary current flows to either of primary windings N1–A and N1–B. The flux stored in center leg C during period T1 will thus begin to decay, causing the voltage induced in secondary winding N3 to reverse with the result that diode D3 will now be forward biased to permit the energy stored in center leg C to discharge and produce the output current I3, as illustrated by the I3 graph in FIG. 2. It will be noted in graph I2–A in FIG. 2 that a relatively smaller output current IM is also provided from secondary winding N2–A during period T2 as a result of the discharging, during period T2, of the magnetizing flux stored in the outer magnetic path during period T1. The size of air gap 12 is preferably chosen to provide a mutual coupling such that the energy stored in center leg C during period T1 will induce an output voltage in winding N3 during period T2 which results in an output current I3 which when added to IM gives a load current I during period T2 which is approximately the same as during period T1, thereby minimizing ripple at load 30.

Time period T3

As will be apparent from graphs I2–A and I in FIG. 2, operation during period T3 is the same as during period T1, except that transistor 22 is now caused to be conducting, while transistor 20 is maintained at cut-off, in which case primary current I1 now flows via input terminals 2 and 3 from source 15 through primary winding N1–B. Thus, during period T3, only secondary winding N2–A will have a voltage induced therein of a polarity which will forward bias its respective diode D2–A, thereby producing a resultant load current I flowing to load 30 of I2–A. As occurred during period T1, energy will be stored in leg C during period T3 as a result of the additive effect of the flux produced in leg C from the flow of primary current I1 in winding N1–B, and from the flow of secondary current I2–A in secondary winding N2–A.

Time period T4

It will be apparent from graphs I3, I2–B and I in FIG. 2 that operation during period T4 is the same as during period T2; that is, both transistors 20 and 22 are maintained off so that no primary current flows, whereupon the resultant decay of the flux stored in center leg C produces the output current I3 from winding N3, while the decay of the magnetizing flux in the outer path produces the output current IM from winding N2–B, the two currents I3 and IM adding to produce the resultant load current I, as illustrated by graph I in FIG. 2.

Figure 3:
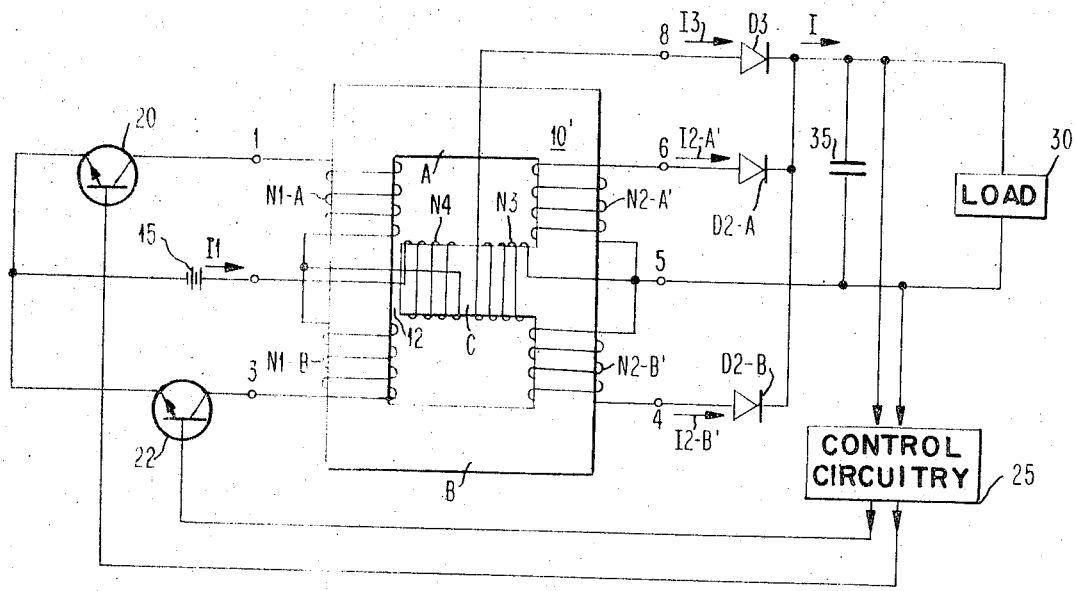
FIG. 3 is a schematic and electrical circuit diagram of a DC-to-DC converter incorporating a modification of a combined transformer and inductor device in accordance with the invention.

A modification of the combined transformer and inductor device in accordance with the invention is illustrated in FIG. 3. As shown, the modified device 10' is basically similar to the device 10 of FIG. 1, except that secondary windings N2–A' and N2–B' are wound oppositely to that of windings N2–A and N2–B, and an additional primary winding N4 is provided coupled to center leg C and connected in series with DC source 15; that is, winding N4 is connected between the common junction of primary windings N1–A and N1–B and terminal 2, whereby the primary current I1 flowing from source 15 when either of transistors 20 or 22 is conducting also flows through winding N4.

It will be understood that, because the polarities of secondary windings N2–A' and N2–B' in the combined transformer and inductor device 10' of FIG. 3 are opposite to that of secondary windings N2–A and N2–B of device 10 in FIG. 1, when primary current I1 flows in primary winding N1–A during period T1, only winding N2–A' of device 10' in FIG. 3 (rather than winding N2–B as in device 10 of FIG. 1) will have a voltage induced therein of a polarity which will forward bias its respective diode D2–A. Likewise, when primary current I1 flows in primary winding N1–B during period T3, only winding N2–B of device 10' (rather than winding N2–A as in device 10) will have a voltage induced therein of a polarity which will forward bias its respective diode D2–B. Accordingly, during time periods T1 and T3, device 10' in FIG. 3 will produce respective load currents I2–A' and I2–B', which may be the same as illustrated in FIG. 2 by graphs I2–B and I2–A, respectively, as indicated by the I2–A' and I2–B' designations provided at the right in FIG. 2.

It should be noted that, for device 10' of FIG. 3, transformer action takes place between primary and secondary windings N1–A and N2–A' and primary and secondary windings N1–B and N1–B', rather than between windings N1–A and N2–B and windings N1–B and N2–A as for device 10 in FIG. 1. As a result, if not for the presence of additional primary winding N4 in the device 10' of FIG. 3, only a relatively small magnetizing flux would be stored in center leg C during time periods T1 and T3, since the flux produced in center leg C from the flow of primary current I, through respective primary windings N1–A and N1–B during respective time periods T1 and T3 will be opposite to the flux produced in center leg C from the flow of secondary currents I2–A' and I2–B' in respective secondary windings N2–A' and N2–B' during respective time periods T1 and T3. The additional primary winding N4 in the device 10' of FIG. 3 through which primary current I1 flows is thus provided to produce the desired relatively large stored flux in center leg C during periods T1 and T3 so that the required discharge can occur during periods T2 and T4. Accordingly, in a similar manner as for device 10 of FIG. 1, the stored flux thus provided during periods T1 and T3 in center leg C by winding N4 of device 10' decays during each of time periods T2 and T4 to produce a similar output current I3 from secondary winding N3, as shown by the I3 graph in FIG. 2. It will be understood that, also in a similar manner as for device 10, a magnetizing current IM is also produced in windings N1–B' and N1–A' of device 10' during respective periods T2 and T4 as a result of the decay of the magnetization flux occurring in the outer path, the two currents I3 and IM adding during periods T2 and T4 to produce the resultant load current I illustrated by graph I in the FIG. 2.

Although the modified transformer and inductor device 10' of FIG. 3 has the disadvantage of requiring an additional winding N4 around center leg C, it offers the advantage of permitting the transformer action provided thereby to be improved, since windings N1–A and N2–A' have a common magnetic path (legs A and C) and can, therefore, be wound together to form a single closely coupled winding structure; a like closely coupled winding structure can also be provided for windings N1–B and N2–B which likewise have a common magnetic path (legs B and C). A third such winding structure can additionally be provided for windings N3 and N4 on center leg C. A resultant device 10' can thus be provided made up of three such winding structures, one on each of legs A, B and C.

While the invention has been particularly shown and described with reference to the preferred embodiments thereof, it will be understood by those skilled in the art that various changes in form and details may be made therein without departing from the spirit and scope of the invention.

What is claimed is:

1. A transformer comprising a magnetic core structure providing a main flux path and a relatively high reluctance shunt path cooperative with first and second portions of said main flux path to provide first and secondary subsidiary flux paths, primary and secondary winding means, each having a first and a second segment interconnected by a node and respectively linking said first and second subsidiary paths, each node being connected in circuit with an individual external terminal, the winding directions of said first and second segments being such with respect to the corresponding node connection as to provide magneto motive forces of opposite directions in said main path when current from or to the respective external terminal divides or combines at said node, and output winding means linking said shunt path and having one end connected to said node of said secondary winding means, the ends of each said winding means remote from the associated node being connected to respective separate external terminals.

2. The transformer of claim 1, wherein said shunt path contains an air gap.

3. The transformer of claim 1, wherein said node in said primary winding means is connected directly to the associated external terminal.

4. The transformer of claim 3, wherein said shunt path contains an air gap.

5. The transformer of claim 1, wherein said primary winding means includes an additive primary segment linking said shunt path, and electrically interconnecting said node of said primary winding means and the associated external terminal.

6. The transformer of claim 5, wherein said shunt path contains an air gap.

7. In combination:
a magnetic structure comprising magnetic material having a configuration providing a center and two outer interconnected legs, with an air gap in the center leg,
said structure providing first and second magnetic paths and said air gap being chosen to provide predetermined mutual coupling therebetween,
said first magnetic path being an unbroken path of magnetic material including the two outer legs and having a relatively low magnetic reluctance,
said second magnetic path including the center leg and having a relatively high magnetic reluctance,
primary and secondary winding means wound on said structure so as to be coupled via said first magnetic path for providing transformer action therebetween,
additional winding means wound on the center leg so as to be coupled to said primary and secondary winding means via said second magnetic path,
said primary and secondary winding means including a first primary winding and a first secondary winding each wound on said structure so as to be coupled to a first portion of said structure including one outer leg,
and a second primary winding and a second secondary winding each wound on said structure so as to be coupled to a second portion of said structure including the other outer leg,
said first and second primary windings being connected in series and wound so that current flow in each in a direction towards their common junction produces a predetermined direction of flux in said center leg,
said primary winding means including a second winding on said center leg having one end connected to the common junction of said first and second primary windings and wound so that current flow towards said common junction produces flux in said center leg having said predetermined direction,
and said first and second secondary windings being connected in series and wound so that current flow in each in a direction away from their common junction produces a like direction of flux in said center leg which is in a direction opposite to said predetermined direction.

References Cited

UNITED STATES PATENTS

| | | | |
|---|---|---|---|
| 2,249,696 | 7/1941 | Pfanstiehl | 336—165X |
| 2,444,715 | 7/1948 | Walker | 336—165X |
| 2,485,398 | 10/1949 | Mandl | 336—165X |
| 2,502,082 | 3/1950 | Foerste I | 336—165X |
| 2,502,083 | 3/1950 | Foerste II | 336—165X |
| 2,611,885 | 9/1952 | Bridges | 336—165X |

FOREIGN PATENTS

| | | | |
|---|---|---|---|
| 193,434 | 1923 | Great Britain | 336—165 |

THOMAS J. KOZMA, Primary Examiner

U.S. Cl. X.R.

321—2, 16, 27; 336—170, 180